April 13, 1937. N. L. JOHNSON 2,077,110
AUTOMOBILE SAFETY BUMPER
Filed Aug. 27, 1936 2 Sheets-Sheet 1

INVENTOR.
NOAH L. JOHNSON
BY
ATTORNEY.

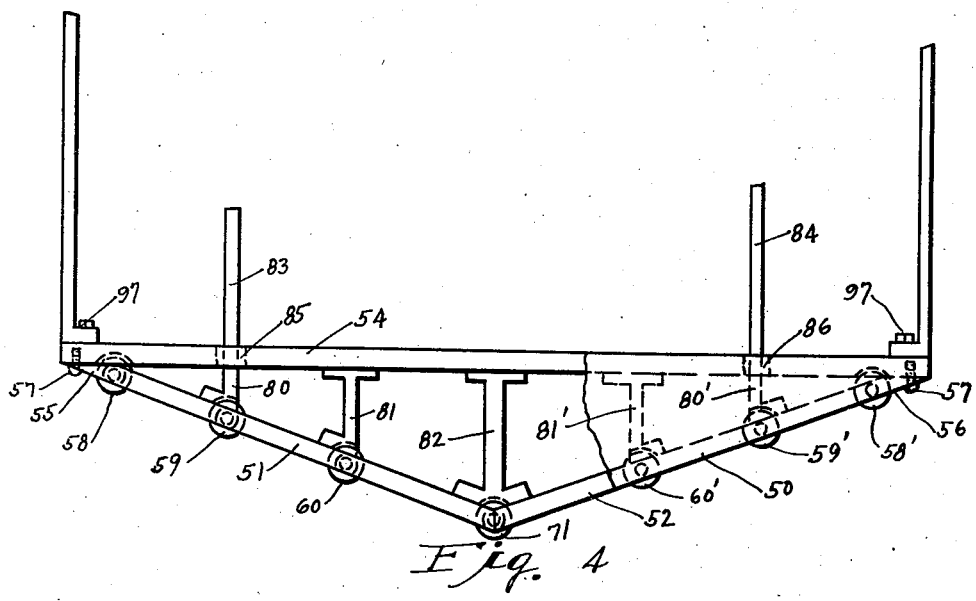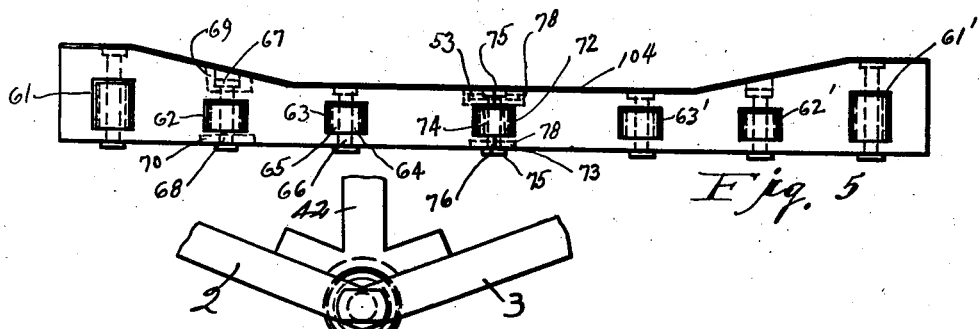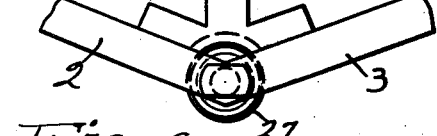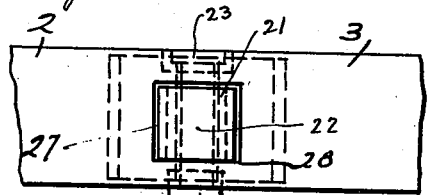

Patented Apr. 13, 1937

2,077,110

UNITED STATES PATENT OFFICE 2,077,110

AUTOMOBILE SAFETY BUMPER

Noah L. Johnson, Cincinnati, Ohio

Application August 27, 1936, Serial No. 98,154

8 Claims. (Cl. 293—55)

The invention relates to front and rear bumpers or extensions to motor vehicles.

It is well known that numerous persons have suffered death and severe injury as a result of head-on collisions of motor vehicles, and as a result of motor vehicles colliding head-on with obstructions such as street car loading platforms, and the like.

Therefore, an important object of the invention is to provide simple, efficient and practical means adapted to be attached to the front ends of motor vehicles, whereby when a motor vehicle collides with another vehicle, or with an obstruction, the line of travel of said vehicle is adapted to be diverted and prevent head-on contact of said vehicle with the other vehicle, or other obstruction.

Other objects of the invention are to provide means adapted to divert the line of travel of a vehicle which collides with either the rear or side of a motor vehicle having the invention attached thereto; and to provide means particularly adapted to lessen the usual hazards of driving and riding in motor vehicles.

Still other objects are made apparent by reference to the drawings, and the hereinafter description.

The invention resides in the combination, arrangement of the parts and in the details of the construction, as will be more fully hereinafter described and claimed.

In the drawings:

Fig. 4 is a plan view of the rear bumper, with the arms partly broken away;

Fig. 5 is a rear elevational view of the rear bumper;

Fig. 6 is an elevational view of the front bumper with parts broken away; and

Fig. 7 is a front elevational view of the portion of the bumper shown in Fig. 6.

Figure 1:
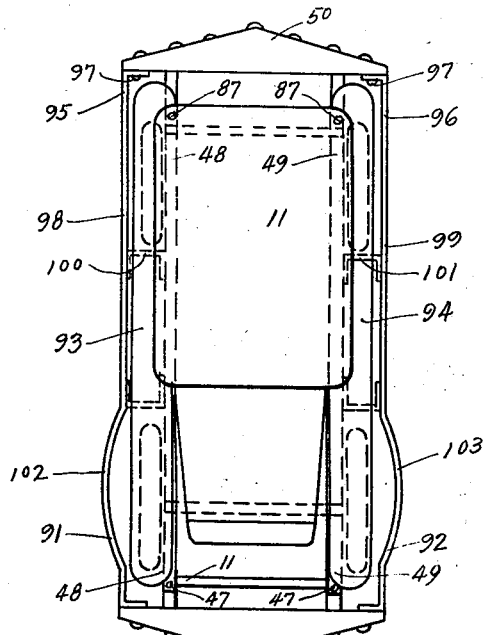
Fig. 1 is a plan view of a motor vehicle having the invention incorporated therewith.
Figure 2:
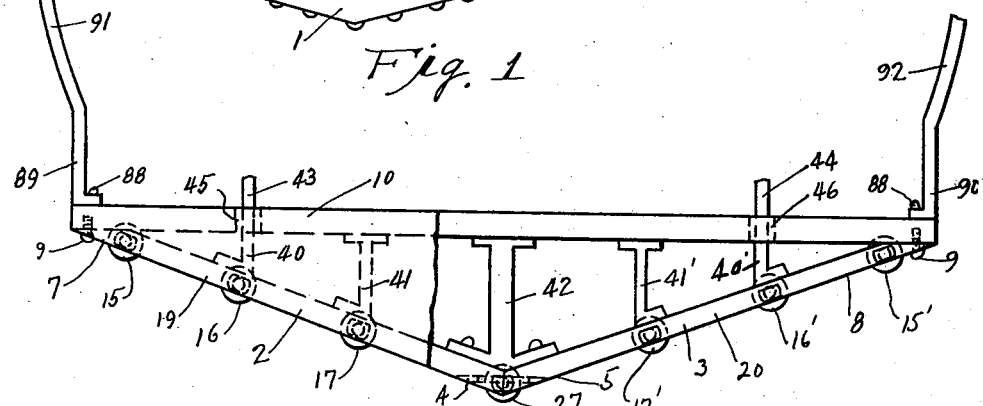
Fig. 2 is a plan view of the front bumper and showing the arm partly broken away.
Figure 3:
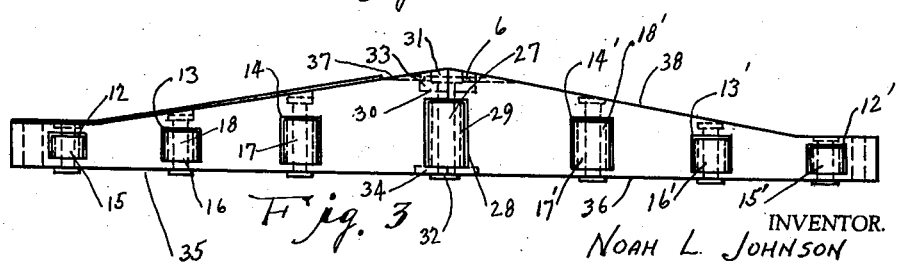
Fig. 3 is a front elevational view of the same.

In the preferred construction of the invention I provide the front bumper 1 comprising the plates 2 and 3 inclined rearwardly and outwardly, and having the inner ends 4 and 5 attached to each other in any suitable manner, as by the bolts 6.

Fixed to the outer ends 7 and 8, of the plates 2 and 3, as by the bolts 9, is the plate 10 which extends transversely of the motor vehicle 11.

In the plates 2 and 3 respectively, are the slots 12, 13, and 14, and 12', 13' and 14' in which are rotatably mounted the vertical rollers 15, 16, and 17, and 15', 16', and 17' whose outer and front sides 18 and 18' extend outwardly from the front surfaces 19 and 20 of the plates 2 and 3. Each roller is tubular and has therein the cylindrical block 21 which may be formed from any suitable resilient material such as rubber, or like material. Extending through each block 21 is the vertical shaft 22 whose upper and lower ends 23 and 24 are rotatably mounted in the rubber bearings 25 and 26 in the plates 2 and 3.

The center vertical roller 27 is rotatably mounted in the slot 28 formed in the inner ends 4 and 5 of the plates 2 and 3. The roller 27 is tubular and has fixed therein the resilient cylindrical block 29, formed from rubber or other suitable resilient material, through which extends the vertical shaft 30 whose upper and lower ends 31 and 32 are rotatably mounted in the rubber bearings 33 and 34.

The lower edges 35 and 36, of the plates 2 and 3, are horizontal, and the upper edges 37 and 38, of the plates, are inclined downwardly and outwardly.

Extending rearwardly and in horizontal alignment with the rollers 16, 17, 16', 17' and 27 are the horizontal braces 40, 41, 40', 41', and 42.

The rear ends of the braces 40 and 40' having integrally connected therewith the extensions 43 and 44, which pass through the slots 45 and 46, in the plate 10, and are attached, as by the bolts 47, to the front ends of the side frame members 48 and 49, of the motor vehicle 11.

The rear bumper 50 is formed somewhat similar to the front bumper 1 and comprises the forwardly and outwardly inclined plates 51 and 52 having their inner ends fixed to each other as by the bolt 53 and having the horizontal plate 54 fixed to their outer ends 55 and 56, as by the bolts 57. The vertical rollers 58, 59 and 60, and 58', 59' and 60' are rotatably mounted in the slots 61, 62, and 63, and 61', 62', and 63' in the plates 51 and 52. Each roller comprises the tube 64 having therein the resilient cylindrical block 65 having extending therethrough the vertical shaft 66 having its upper and lower ends 67 and 68 mounted in the rubber bearings 69 and 70. The center vertical roller 71 is mounted in the slot 72 formed in the inner ends of the plates 51 and 52 and comprises the tube 73 having therein the resilient cylindrical block 74 having extending therethrough the vertical shaft 75 having its upper and lower ends 76 and 77 mounted in the rubber bearing 78. The outer surface of the rollers 58, 59, and 60, and 58', 59', 60' and 71 extend outwardly from the rear and outer surfaces of the plates 51 and 52.

The braces 80, 81, 80', 81', and 82 extend horizontally between the plates 51, 52 and the plate 54. The braces 80 and 80' have integrally connected with their front ends the extensions 83 and 84 which pass through the slots 85 and 86 in plate 54 and are connected, as by the bolts 87, to the rear ends of the side frame members 48 and 49 of the motor vehicle 11.

Fixed to the outer ends of the plate 10, as by the rivets 88, are the front ends 89 and 90 of the arms 91 and 92 which extend rearwardly of the motor vehicle and under the running boards 93 and 94. The rear ends 95 and 96, of the arms 91 and 92, are fixed, as by the rivets 97, to the outer ends of the plate 54. The outer edges 98 and 99, of the arms 91 and 92, extend outwardly from the running boards and are retained in fixed position as by the brace rods 100 and 101 which are fixed to the arms 91 and 92, running boards 93 and 94 and side frame members 48 and 49 of the motor vehicle 11.

The front ends of the arms 91 and 92 are curved outwardly at 102 and 103 to provide sufficient space for movement of the front wheels of the motor vehicle 11.

The plates 51, 52 and 54, of the rear bumper, are inclined downwardly and outwardly, and the upper edge of the plate 54 has therein the groove 104 to provide sufficient space to permit opening and closing the usual truck door of the motor vehicle 11.

An advantage of the invention is that when the motor vehicle 11 collides head-on with another vehicle, or an obstruction, the line of travel of the vehicle will be diverted, as by the plates 2 and 3, and the rollers 15, 16, 17, 15', 16', 17' and 27, whereby great injury and harm may be prevented the vehicle and its occupants because the vehicle will not be suddenly stopped. Also, the plates 51 and 52, and the rollers therein will divert the line of travel of a vehicle which collides with the vehicle 11.

It is, therefore, apparent that I have invented a useful structure, which embodies the features of advantages enumerated. While I have, in the present instance, shown and described preferred embodiments of the invention, or modifications thereof, various changes may be made in the general form and arrangement of the preferred parts described without departing from the invention. For this reason I do not limit myself to the details of the parts, or materials, or the size and shape thereof, as set forth, but desire to state that I feel at liberty to make such changes and alterations, as fairly fall within the spirit and scope of the claims.

What I claim as new and desire to secure by Letters Patent is:

1. An automobile front bumper comprising a pair of rearwardly and outwardly inclined plates having their inner ends fixed to each other, a plurality of spaced apart vertical rollers rotatably mounted in said plates and having their outer surfaces extending outwardly and forwardly of the outer surfaces of said plates, a horizontal plate extending transversely of the automobile and being fixed to said first mentioned plates, braces extending between said first mentioned plates and said second mentioned plates and in horizontal alignment with said rollers, means to fix the bumper to the automobile, a pair of arms fixed to the outer ends of the bumper and extending rearwardly beneath the running boards of the automobile, the outer edges of said arms extending outwardly of the outer edges of said running boards, a rear bumper comprising a pair of forwardly and outwardly inclined plates having their inner ends fixed to each other, a plurality of vertical rollers being rotatably mounted in said last mentioned plates, a horizontal plate fixed to the outer ends of said last mentioned plates, means to fix said rear bumper to the automobile, the rear ends of said arms being fixed to said rear bumper, the top edges of all of said plates being inclined downwardly and outwardly.

2. An automobile front bumper comprising a pair of rearwardly and outwardly inclined plates having their inner ends fixed to each other, a plurality of spaced apart rollers rotatably mounted in said plates and having their outer surfaces extending outwardly and forwardly of the outer surfaces of said plates, a plate being fixed to said first mentioned plates, braces extending between said first mentioned plates and said second mentioned plates and in horizontal alignment with said rollers, means to fix the bumper to the automobile, a pair of arms fixed to the outer ends of the bumper and extending rearwardly beneath the running boards of the automobile, the outer edges of said arms extending outwardly of the outer edges of said running boards, a rear bumper comprising a pair of forwardly and outwardly inclined plates having their inner ends fixed to each other, a plurality of vertical rollers being rotatably mounted in said last mentioned plates, a horizontal plate fixed to the outer ends of said last mentioned plates, means to fix said rear bumper to the automobile, the rear ends of said arms being fixed to said rear bumper, the top edges of all of said plates being inclined downwardly and outwardly.

3. An automobile front bumper comprising a pair of rearwardly and outwardly inclined plates having their inner ends fixed to each other, a plurality of spaced apart vertical rollers rotatably mounted in said plates and having their outer surfaces extending outwardly and forwardly of the outer surfaces of said plates, a horizontal plate extending transversely of the automobile and being fixed to said first mentioned plates, braces extending between said first mentioned plates and said second mentioned plates and in horizontal alignment with said rollers, means to fix the bumper to the automobile, a pair of arms fixed to the outer ends of the bumper and extending rearwardly beneath the running boards of the automobile, the outer edges of said arms extending outwardly of the outer edges of said running boards, a rear bumper comprising a pair of forwardly and outwardly inclined plates having their inner ends fixed to each other, a plurality of vertical rollers being rotatably mounted in said last mentioned plates, a horizontal plate fixed to the outer ends of said last mentioned plates, means to fix said rear bumper to the automobile, the rear ends of said arms being fixed to said rear bumper.

4. An automobile front bumper comprising a pair of rearwardly and outwardly inclined plates having their inner ends fixed to each other, a plurality of spaced apart rollers rotatably mounted in said plates, a plate being fixed to said first-mentioned plates, means to fix the bumper to the automobile, a pair of arms fixed to the outer ends of the bumper and extending rearwardly beneath the running boards of the automobile, the outer edges of said arms extending outwardly of the outer edges of said running boards, a rear bumper comprising a pair of forwardly and outwardly inclined plates having their inner ends fixed to each other, a plurality of vertical rollers being rotatably mounted in said last mentioned plates, a horizontal plate fixed to the outer ends of said last mentioned plates, means to fix said rear bumper to the automobile, the rear ends of said arms being fixed to said rear bumper.

5. An automobile bumper including a pair of rearwardly and outwardly inclined plates, and a plurality of vertical rollers rotatably mounted in said plates, each of said rollers comprising a tube and a cylindrical resilient block in said tube, and means to fix said bumper to the front end of the automobile.

6. An automobile bumper including a pair of inclined plates, and a plurality of rollers rotatably mounted in said plates, each of said rollers comprising a tube and a cylindrical resilient block in said tube, and means to fix said bumper to the front end of the automobile.

7. An automobile bumper including a pair of rearwardly and outwardly inclined plates, and a plurality of vertical rollers rotatably mounted in said plates, each of said rollers comprising a tube and a cylindrical resilient block in said tube.

8. An automobile bumper including a pair of inclined plates, and a plurality of rollers rotatably mounted in said plates, each of said rollers comprising a tube and a cylindrical resilient block in said tube.

NOAH L. JOHNSON.